(12) United States Patent
Haustein et al.

(10) Patent No.: US 8,090,917 B2
(45) Date of Patent: Jan. 3, 2012

(54) MANAGING STORAGE AND MIGRATION OF BACKUP DATA

(75) Inventors: Nils Haustein, Soergenloch (DE); Frank Krick, Ockenheim (DE); Ulf Troppens, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 12/117,778

(22) Filed: May 9, 2008

(65) Prior Publication Data

US 2009/0282203 A1 Nov. 12, 2009

(51) Int. Cl.
G06F 12/00 (2006.01)
G06F 13/00 (2006.01)
G06F 13/28 (2006.01)

(52) U.S. Cl. .................. 711/162; 711/E12.001

(58) Field of Classification Search .......... 711/162, 711/E12.001
See application file for complete search history.

(56) References Cited

U.S. PATENT DOCUMENTS

| | | | | |
|---|---|---|---|---|
| 6,023,710 | A * | 2/2000 | Steiner et al. | 1/1 |
| 7,774,315 | B1 * | 8/2010 | Galker | 707/644 |
| 2002/0107877 | A1 * | 8/2002 | Whiting et al. | 707/204 |
| 2004/0193953 | A1 * | 9/2004 | Callahan et al. | 714/15 |
| 2006/0031651 | A1 * | 2/2006 | Nonaka et al. | 711/163 |
| 2006/0206547 | A1 * | 9/2006 | Kulkarni et al. | 707/205 |
| 2008/0313641 | A1 * | 12/2008 | Inoue et al. | 718/104 |
| 2009/0044035 | A1 * | 2/2009 | Taguchi et al. | 713/340 |
| 2009/0177661 | A1 * | 7/2009 | Sandorfi et al. | 707/9 |

* cited by examiner

*Primary Examiner* — Sheng-Jen Tsai
(74) *Attorney, Agent, or Firm* — Schmeiser, Olsen & Watts

(57) ABSTRACT

A method and system for client backup data management and storage using virtual tape libraries (VTLs). A VTL controller executing a software method receives metadata that distinguishes among a plurality of different versions of backup data. The VTL controller determines a latest version of the backup data. The VTL controller determines a migration set of zero or more versions of the backup data. The latest version and any version included in the migration set are included in the plurality of different versions. The VTL controller determines that a storage of the latest version in a first storage medium (e.g., magnetic disk) of the VTL is complete. The VTL controller migrates the migration set to a second storage medium (e.g., magnetic tape) of the VTL if the migration set includes at least one version of the backup data.

20 Claims, 7 Drawing Sheets

FIG. 4

| BYTE | BIT | | | | | | | |
|------|---|---|---|---|---|---|---|---|
| | 7 | 6 | 5 | 4 | 3 | 2 | 1 | 0 |
| 0 | PS=1 | RSVD | PAGE CODE = 25h | | | | | | ← 402 |
| 1 | PAGE LENGTH = 0Ah | | | | | | | | ← 404 |
| 3 | (MSB) | | | NAME OF CLIENT | | | | | ← 406 |
| 4 | | | | | | | | (LSB) |
| 5 | (MSB) | | | TYPE OF BACKUP | | | | | ← 408 |
| 6 | | | | | | | | (LSB) |
| 7 | (MSB) | | | TIME STAMP | | | | | ← 410 |
| 8 | | | | | | | | |
| 9 | | | | | | | | |
| 10 | | | | | | | | |
| 11 | | | | | | | | |
| 12 | | | | | | | | (LSB) |

400

| Date & Time | Client Name | Type of Backup | Virtual Tape(s) |
|---|---|---|---|
| 04/14/08 18:00:00 | 1234 | Full | MIA000 |
| 04/15/08 18:00:00 | 1234 | Incremental | MIA001 |
| 04/16/08 18:00:00 | 1234 | Incremental | MIA001 |
| 04/17/08 18:00:00 | 1234 | Differential | MIA002 |
| 04/18/08 18:00:00 | 1234 | Incremental | MIA003 |
| 04/19/08 18:00:00 | 1234 | Incremental | MIA003 |
| 04/20/08 18:00:00 | 1234 | Full | MIA004 |

*FIG. 5*

| BYTE | BIT 7 | 6 | 5 | 4 | 3 | 2 | 1 | 0 |
|---|---|---|---|---|---|---|---|---|
| 0 | | | | OPERATION CODE (2Bh) | | | | |
| 1 | LOGICAL UNIT NUMBER | | | RESERVED | | | | MIGRATE |
| 2 | (MSB) | | | TRANSPORT ELEMENT ADDRESS | | | | |
| 3 | | | | | | | | (LSB) |
| 4 | (MSB) | | | DESTINATION ELEMENT ADDRESS | | | | |
| 5 | | | | | | | | (LSB) |
| 6 | | | | RESERVED | | | | |
| 7 | | | | RESERVED | | | | |
| 8 | | | | RESERVED | | | | INVERT |
| 9 | | | | CONTROL | | | | |

MANAGING STORAGE AND MIGRATION OF BACKUP DATA

FIELD OF THE INVENTION

The present invention relates to data processing techniques for managing backup data, and more particularly to a method and system for using virtual tape libraries to manage the storage and migration of backup data.

BACKGROUND OF THE INVENTION

Backup is a process in which data is copied from a backup client computing system to a backup server computing system that includes backup storage. In response to a data loss at the client computing system, the data can be recovered from the backup server computing system. Successive backups create multiple versions of backup data. For conventional systems (e.g., LAN-free clients) that cannot employ an active data pool backup method, management of multiple versions of backup data fails to promote information lifecycle management, creates a non-optimized total cost of ownership related to storage media being used to store backup data, and/or wastes energy by failing to optimize the use of low-power consumption storage media. Thus, there exists a need to overcome at least one of the preceding deficiencies and limitations of the related art.

SUMMARY OF THE INVENTION

In first embodiments, the present invention provides a computer-implemented method of managing storage and migration of backup data. In response to a receipt of a client's request for a backup of a set of data to generate backup data and via an execution of a software method, a virtual tape library (VTL) controller included in a VTL receives metadata that distinguishes among a plurality of different versions of the backup data. The VTL controller determines a latest version of the backup data. The latest version is included in the plurality of different versions of the backup data. The VTL controller determines a migration set of zero or more versions of the backup data. Any version of the backup data included in the migration set is included in the plurality of different versions of the backup data. The migration set is determined to be either (1) a set of one or more versions of the backup data, or (2) an empty set including no version of the backup data. Subsequent to determining the latest version, the VTL controller determines that a storage of the latest version in a first storage medium of the VTL is complete. Subsequent to determining the migration set, the VTL controller migrates the migration set to a second storage medium of the VTL if the migration set is the set of one or more versions of the backup data.

In second embodiments, the present invention provides a computer-implemented method of managing storage and migration of backup data. In response to a receipt of a request from the client computing system for a backup of a set of data to generate backup data, a backup server receives metadata from the client computing system. The metadata distinguishes among a plurality of different versions of the backup data. The metadata includes a client name, a backup type, and a timestamp. The client name is an identifier of the client computing system, the backup type is a type of the backup of the set of data, and the timestamp includes a date and a time of the backup of the set of data. The backup server determines a latest version of the backup data. The latest version is included in the plurality of different versions of the backup data. The backup server identifies a first virtual tape of a virtual tape library (VTL) based on an identification of the backup type included in the metadata. The backup server mounts the first virtual tape. The backup server determines a migration set of zero or more versions of the backup data based on the backup type. Any version of the backup data included in the migration set is included in the plurality of different versions of the backup data. The migration set is selected to be either (1) a set of one or more versions of the backup data, or (2) an empty set that includes no version of the backup data. Subsequent to determining the latest version, the backup server determines that storage of the latest version in a first storage medium of the VTL is complete. The backup server instructs the VTL to perform a migration of the migration set to a second storage medium of the VTL. The backup server determines that the migration of the migration set to the second storage medium is complete. The backup server identifies a first virtual tape identifier that identifies the first storage medium. The backup server updates a record of a database table with the client name, the backup type, the timestamp and the first virtual tape identifier. The backup server identifies a second virtual tape identifier that identifies the second storage medium. The backup server removes any record in the database table that includes an identifier of a virtual tape that matches the second virtual tape identifier.

Systems and computer program products corresponding to the above-summarized methods are also described herein.

BRIEF DESCRIPTION OF THE DRAWINGS

FIG. 4 depicts an exemplary mode page that is sent in the process of FIG. 2, in accordance with embodiments of the present invention.

FIG. 5 is an exemplary backup history table accessed to select virtual tapes in the process of FIG. 2, in accordance with embodiments of the present invention.

FIG. 6 depicts a modified position to element command for migrating selected virtual tapes in the process of FIG. 2, in accordance with embodiments of the present invention.

DETAILED DESCRIPTION OF THE INVENTION

Overview

The present invention ensures that the latest (i.e., newest or most recent) version of backup data for a client computing system (a.k.a. client) is retained on virtual disks of a virtual tape library (VTL) while other, older versions of the backup data are retained on a secondary storage medium such as magnetic tape. Novel software may be executed by a backup server and by a VTL controller to allow the retention of the latest version of backup data on a first storage medium within a VTL while subsequent versions are automatically migrated to a second storage medium associated with the VTL (e.g., a secondary storage medium included in the VTL). In one embodiment, the backup server informs the VTL about the type of backup and an identification of the client (e.g., client name) that is requesting a backup of data. The VTL may keep track of the virtual tapes used by the client and the type of backup. Furthermore, the VTL may automatically derive policies for data migration from the first storage medium to the second storage medium for all data which does not include the latest version at the end of each backup process for the client.

In an alternate embodiment, the backup server controls the entire process of selecting virtual tapes to be migrated to a secondary storage medium associated with the VTL. The backup server uses a modified Small Computer System Interface (SCSI) command (e.g., a position to element command) that instructs the VTL to migrate a specific virtual tape to a second storage medium.

Backup Data Storage and Migration Management System

Figure 1:
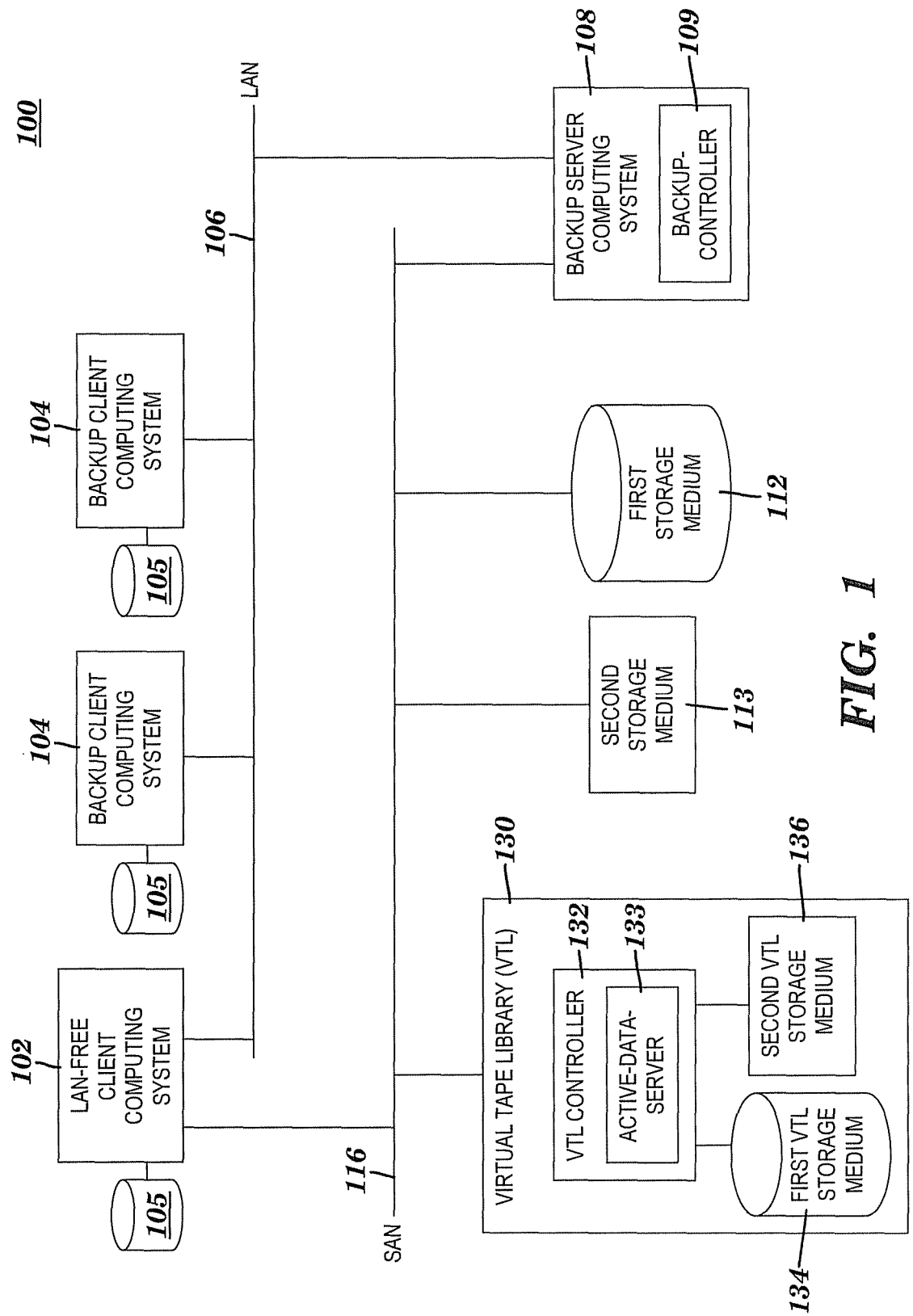
FIG. 1 is a block diagram of a system for managing storage and migration of backup data, in accordance with embodiments of the present invention.

FIG. 1 is a block diagram of a system for managing storage and migration of backup data, in accordance with embodiments of the present invention. System 100 may include multiple client computing systems (hereinafter, also referred to as clients, client systems, or backup clients), including a local area network (LAN)-free client 102 and LAN-based backup clients 104. Each client 102 or 104 has a unique client name that identifies the client (e.g., a computer name). Each client 102 or 104 needs to backup data residing on a local or shared storage medium 105 coupled to the client. As used herein, a storage medium is a computer data storage unit, such as a magnetic disk or a magnetic tape (i.e., digital tape). Clients 102, 104 may be connected via a first network 106 to backup server computing system 108 (hereinafter, also referred to as the server or backup server). Network 106 is, for example, a LAN. Backup server 108 executes a backup-controller 109, which is software for managing backup data storage and migration. The novel functionality of backup-controller 109 is described in more detail below (see, e.g., the discussion of FIG. 2). Backup server 108 may be coupled to: (1) a first storage medium 112 (e.g., a hard disk), (2) a second storage medium 113 (e.g., magnetic tape), and (3) a VTL 130. The connection of backup server 108 to first storage medium 112, second storage medium 113 and VTL 130 may be via a second network 116 (e.g., a storage area network (SAN)).

In a first embodiment (not shown in FIG. 1), first network 106 and second network 116 are the same network. Networks 106 and 116 are the same network, for example, if client system 104 uses the Small Computer Systems Interface protocol over the Internet (iSCSI) to transfer data to VTL 130 and uses Transmission Control Protocol/Internet Protocol (TCP/IP) to transfer metadata to backup server 108 via local area network (LAN) 106. In a second embodiment, first network 106 is different from second network 116 (e.g., first network 106 is a LAN and second network 116 is a Storage Area Network (SAN), as shown in FIG. 1). Networks 106 and 116 are different, for example, if client system 102 uses the Small Computer Systems Interface protocol over Fibre Channel to transfer data to VTL 130 via network 116 and metadata to backup server 108 via network 106.

LAN-free client system 102 may be directly connected (via network 116) to VTL 130. VTL 130 may include a VTL controller 132 (a.k.a. virtualization engine or virtual tape server controller) that presents data storage as virtual tape libraries, virtual tape drives and virtual tapes. VTL controller 132 includes a processor (not shown) that executes a novel software-based method referred to herein as active-data-server 133. VTL 130 may also include a first VTL storage medium 134 (e.g., a hard disk virtualized as a tape) and a second VTL storage medium 136 (e.g., a magnetic tape managed by VTL controller 132). VTL controller 132 executes active-data-server 133 to manage the storage of backup data and the migration of backup data from first VTL storage medium 134 to second VTL storage medium 136. Active-data-server 133 and backup-controller 109 may communicate via second network 116 to ensure that the latest version of backup data is stored on first VTL storage medium 134 and that older versions of the backup data are automatically migrated to second VTL storage medium 136. The novel functionality of active-data-server 133 is described in more detail below (see, e.g., the discussion of FIG. 2). Before a backup of data starts, backup-controller 109 may send a message to active-data-server 133, which informs VTL 130 about the name of the client requesting the backup and the type of backup being requested.

In one embodiment, second VTL storage medium 136 is identical to second storage medium 113. In another embodiment, second VTL storage medium 136 is different from second storage medium 113.

Data Storage and Migration Management Process

Figure 2:
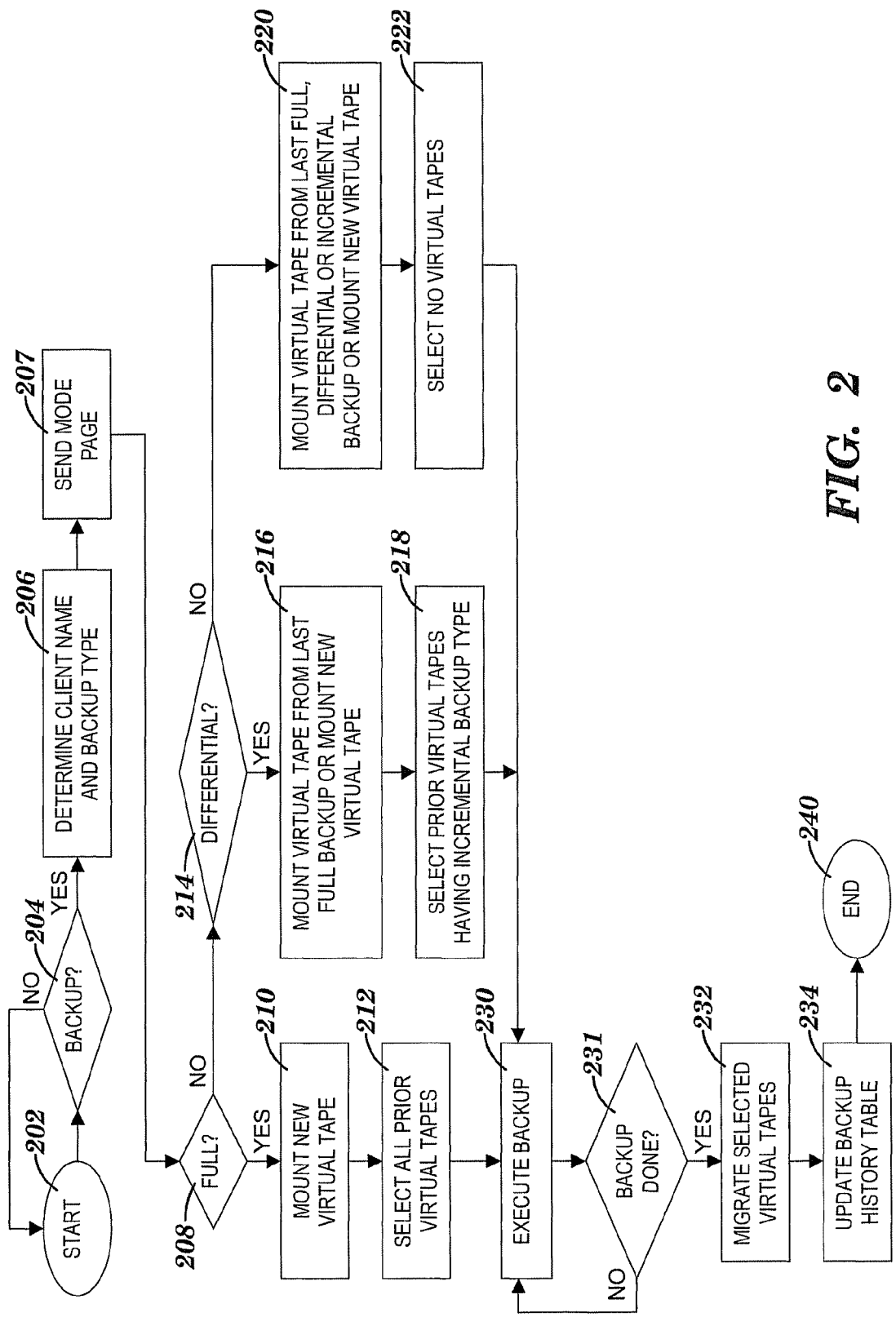
FIG. 2 is a flow diagram of a backup data storage and migration management process implemented in the system of FIG. 1, in accordance with embodiments of the present invention.

FIG. 2 is a flow diagram of a backup data storage and migration management process implemented in the system of FIG. 1, in accordance with embodiments of the present invention. Backup server 108 (see FIG. 1) is responsible for mounting virtual tapes in VTL 130 (see FIG. 1) whenever a client system 102 or 104 (see FIG. 1) requests a backup of data. The novel backup-controller 109 (see FIG. 1) included in backup server 108 (see FIG. 1) executes a method that ensures that an appropriate virtual tape is mounted in accordance with the name of the client requesting the backup and the type of backup being requested. The aforementioned method of ensuring the appropriate virtual tape is mounted is incorporated in the active data process of FIG. 2. The inventive active data process of FIG. 2 is executed by the novel backup-controller 109 (see FIG. 1) and the novel active-data-server 133 (see FIG. 1) and assures that the latest version of backup data from a given client system is stored and retained on a first storage medium (e.g., first VTL storage medium 134 of FIG. 1) and all other versions of backup data (i.e., versions older than the latest backup version) are migrated to a second storage medium (e.g., second VTL storage medium 136 of FIG. 1).

The active data process of FIG. 2 starts in step 202. In step 204, the backup server 108 (see FIG. 1) checks if a client system (e.g., client 102 or client 104 of FIG. 1) requires a backup. For example, step 204 determines if backup server 108 (see FIG. 1) receives a request from client 102 (see FIG. 1) to backup data. If the answer in step 204 is Yes (i.e., a client system 102 or 104 in FIG. 1 requires a backup of data), then the active data process flows to step 206, otherwise the active data process flows back to the starting step 202. In this section describing FIG. 2, the client system 102 or 104 (see FIG. 1) that requests the backup of data is simply referred to as "the client" or "the client system."

In step 206, which is entered when a client backup must be executed, backup-controller 109 (see FIG. 1) included in backup server 108 (see FIG. 1) determines metadata that distinguishes between different versions of the backup data. In one embodiment, the metadata distinguishes between a newest version of the backup data and one or more older versions of the backup data. The newest version of the backup data is a version resulting from the current backup being performed by the process of FIG. 2. An older version of the backup data is a version resulting from a backup previously performed by the process of FIG. 2. In one embodiment, step 206 includes backup-controller 109 (see FIG. 1) determining the name of the client requesting the backup (i.e., determining the client name), the type of the backup (a.k.a. backup type), and a timestamp (e.g., the current date and time indicating the start of the backup). For example, backup-controller 109 (see FIG. 1) determines the backup type by identifying a backup type included in the client system's request for a backup (see step 204). Different types of backup include:

1. Full backup: Backs up all data.
2. Differential backup: A cumulative backup of all data which has changed since the last full backup.
3. Incremental backup: Backs up all data which has changed since the last backup of any type.

In step 207, backup-controller 109 (see FIG. 1) sends metadata determined in step 206 to active-data-server 133 (see FIG. 1) via a mode page as part of a SCSI mode select command. In one embodiment, step 207 includes backup-controller 109 (see FIG. 1) sending the client name, backup type, and timestamp determined in step 206 to the active-data-server 133 (see FIG. 1) via a mode page. The mode page sent in step 207 is specified by a mode select command (e.g., the SCSI mode select command shown in FIG. 3). An example of the mode page sent in step 207 is shown in FIG. 4. The active-data-server 133 (see FIG. 1) included in VTL 130 (see FIG. 1) stores the client name, backup type and timestamp sent in step 207 in a backup history database table (see, e.g., the backup history table of FIG. 5).

In step 208, backup-controller 109 (see FIG. 1) checks if the type of backup is "full" (i.e., checks if the client system is requesting a full backup). If the answer to the inquiry in step 208 is Yes, then the active data process flows to step 210, at which the backup-controller 109 (see FIG. 1) notifies the backup server 108 (see FIG. 1) to mount a new virtual tape in VTL 130 (see FIG. 1). Step 210 also includes backup server 108 (see FIG. 1) mounting the new virtual tape in accordance with the instruction from backup-controller 109 (see FIG. 1). In one embodiment, step 210 also includes active-data-server 133 (see FIG. 1) receiving a command from backup server 108 (see FIG. 1) to mount the new virtual tape and determining a virtual tape identifier of the new virtual tape being mounted. The full backup backs up the latest versions for every data object. Therefore, a new virtual tape is to be used in the full backup, making all prior virtual tapes candidates for migration. As used herein, prior virtual tapes are virtual tapes that were previously mounted and used in backups for the client. The new virtual tape is placed on the first storage medium (e.g., first VTL storage medium 134 of FIG. 1).

In step 212, active-data-server 133 (see FIG. 1) included in VTL 130 (see FIG. 1) selects all virtual tapes that were previously mounted for backup requests made by the client and that can be migrated. Thus, in step 212, VTL 130 (see FIG. 1) utilizes the backup history database table and determines a list of migration candidates. That is, VTL 130 (see FIG. 1) selects all virtual tapes (e.g., from column 508 of table 500 in FIG. 5) which have been previously used by the client (i.e., the client named in the corresponding row in column 504 of table 500 in FIG. 5) and have not been migrated to the second storage medium (e.g., second VTL storage medium 136 of FIG. 1). The list of migration candidates is stored in VTL controller 132 (see FIG. 1). From step 212, the active data process flows to step 230, which is explained after the descriptions of steps 214-222.

Returning to step 208, if the backup-controller 109 (see FIG. 1) determines that the requested backup is not a full backup (i.e., the No branch of step 208 is followed), then the active data process flows to inquiry step 214. In step 214, the backup-controller 109 (see FIG. 1) checks if the backup type is "differential" (i.e., checks if the client requested a differential backup). If the answer in step 214 is Yes, then the active data process flows to step 216. In step 216, if the virtual tape from the last (i.e., most recent) full backup has room for more data, backup-controller 109 (see FIG. 1) instructs backup server 108 (see FIG. 1) to mount the virtual tape from the last full backup. Otherwise in step 216, if the virtual tape from the last full backup does not have room for more data, backup-controller 109 (see FIG. 1) instructs backup server 108 (see FIG. 1) to mount a new virtual tape. The instruction provided to the backup server 108 (see FIG. 1) in step 216 ensures that all other virtual tapes used by the client for incremental backup can be migrated to a second storage medium (e.g., second VTL storage medium 136 of FIG. 1). Step 216 also includes backup server 108 (see FIG. 1) mounting the virtual tape in accordance with the aforementioned instruction from backup-controller 109 (see FIG. 1). In one embodiment, step 216 also includes active-data-server 133 (see FIG. 1) receiving a command from backup server 108 (see FIG. 1) to mount the virtual tape identified in this paragraph and determining a virtual tape identifier of the virtual tape being mounted.

In step 218, active-data-server 133 (see FIG. 1) selects the all virtual tapes pertaining to the client which can be migrated utilizing the backup history database table (e.g., table 500 of FIG. 5). In this case, virtual tapes (e.g., identified in column 508 of table 500 in FIG. 5) are selected so that the corresponding backup type (e.g., the corresponding backup type in column 506 of table 500 in FIG. 5) is incremental and so that the virtual tapes have not yet been migrated to a second storage medium (e.g., second VTL storage medium 136 of FIG. 1). This list of migration candidates is stored in the VTL controller 132 (see FIG. 1). From step 218, the active data process flows to step 230, which is explained below.

Returning to step 214, if backup-controller 109 (see FIG. 1) determines that the requested backup type is not a differential backup (i.e., the No branch of step 214 is followed), then the active data process flows to step 220. In this case (i.e., following the No branch of step 214), the requested backup must be of type incremental since the backup type has been determined to be not full (No branch of step 208) and not differential (No branch of step 214). In step 220, if the virtual tape used for the last (i.e., most recent) full backup has more room for data, then backup-controller 109 (see FIG. 1) instructs the backup server 108 (see FIG. 1) to mount the virtual tape used for the last full backup. If the virtual tape used for the last full backup does not have room for more data, then in step 220, backup controller 109 (see FIG. 1) instructs backup server 108 (see FIG. 1) to mount the virtual tape used for the last (i.e., most recent) differential backup if the virtual tape used for the last differential backup has room for more data. Otherwise, if the virtual tape used for the last differential backup does not have room for more data, then backup controller 109 (see FIG. 1) instructs backup server 108 (see FIG. 1) to mount a new virtual tape. Step 220 also includes backup server 108 (see FIG. 1) mounting the virtual tape (i.e., the virtual tape from the last full backup, the virtual tape from the last differential backup or a new virtual tape) in accordance with the aforementioned instruction in step 220 from backup-controller 109 (see FIG. 1). In one embodiment, step 220 also includes active-data-server 133 (see FIG. 1) receiving a command from backup server 108 (see FIG. 1) to mount the virtual tape identified in this paragraph and determining a virtual tape identifier of the virtual tape being mounted.

In step 222, active-data-server 133 (see FIG. 1) selects no virtual tape as a candidate for migration to the second storage medium because the virtual tapes which are in the first storage medium (e.g., first VTL storage medium 134 of FIG. 1) for the client include only the latest versions of data objects. From step 222, the active data process flows to step 230.

In step 230, a backup process is executed in which backup server 108 (see FIG. 1) or the LAN-free client 102 (see FIG. 1) stores the data on the virtual tape which has been mounted in one of the steps 210, 216 or 220.

In step 231, active-data-server 133 (see FIG. 1) checks if the backup process executed in step 230 has been successfully completed. The backup process is successfully completed if no data is transferred and the virtual tape mounted in step 210, 216 or 220 is dismounted. If step 231 determines that the backup process is not successfully completed (i.e., the No branch of step 231 is followed), then the active data process flows back to step 230 and the backup process continues. Otherwise, if step 231 determines that the backup process is successfully completed, then the active data process flows to step 232.

In step 232, active-data-server 133 (see FIG. 1) migrates the virtual tapes selected in step 212, 218 or 222 from first VTL storage medium 134 (see FIG. 1) to second VTL storage medium 136 (see FIG. 1). Step 232 ensures that all older versions of the data are migrated to a secondary storage medium.

In step 234, active-data-server 133 (see FIG. 1) updates the columns of the backup history database table (e.g., columns 502, 504, 506 and 508 of table 500 in FIG. 5) based on the information received by the mode select command received in step 207 and based on the serial number of the virtual tape mounted in one of the steps 210, 216 or 220. Additionally, active-data-server 133 (see FIG. 1) removes all entries (e.g., rows of the backup history database table) in which the identifier of the virtual tape (e.g., column 508 of table 500 in FIG. 5) matches a virtual tape which has been migrated to a secondary storage medium in step 232. The active data process ends in step 240.

As described above, the active data process of FIG. 2 includes steps which are executed by backup-controller 109 (see FIG. 1) included in backup server 108 (see FIG. 1) and steps which are executed by active-data-server 133 (see FIG. 1) included in VTL 130 (see FIG. 1). In an alternate embodiment, all steps of the process of FIG. 2 are instead executed by backup server 108 and the backup history database table is stored within backup-controller 109 (see FIG. 1). Thus, backup-controller 109 (see FIG. 1) selects all virtual tapes which must be migrated (steps 212 and 218) because backup server 108 (see FIG. 1) has knowledge of the information in the backup history database table. In addition, backup server 108 (see FIG. 1) knows when the backup process starts (step 230) and ends (step 231). For the migration of virtual tapes from first VTL storage medium 134 (see FIG. 1) to second VTL storage medium 136 (see FIG. 1) in step 232, backup-controller 109 (see FIG. 1) according to backup server 108 (see FIG. 1) communicates with active-data-server 133 (see FIG. 1) of VTL 130 (see FIG. 1), which in this case receives a message and performs the appropriate migration action. For example, the message to perform the appropriate migration action in step 232 is transported by a modified SCSI position to element command (see, e.g., position to element command 600 in FIG. 6).

Figure 3:
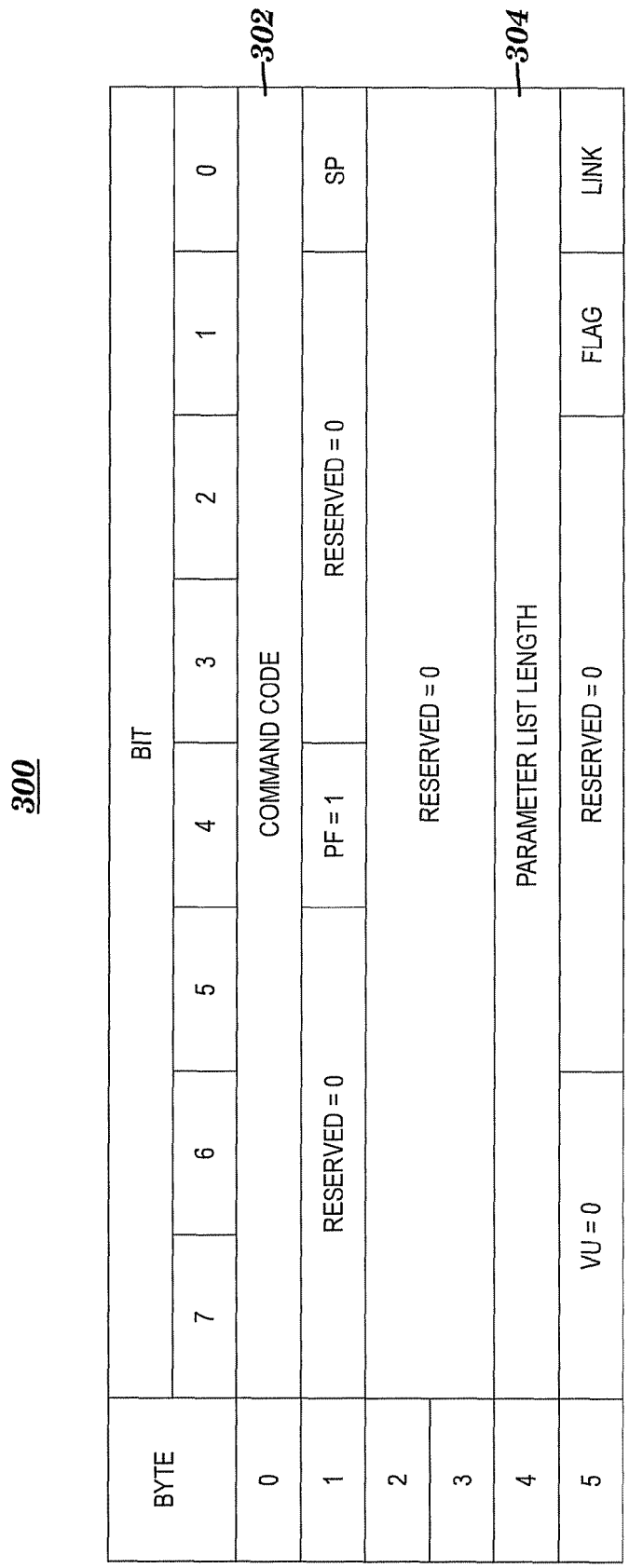
FIG. 3 depicts a mode select command used to send a mode page in the process of FIG. 2, in accordance with embodiments of the present invention.

FIG. 3 depicts a mode select command according to the SCSI protocol standard used to send a mode page in the process of FIG. 2, in accordance with embodiments of the present invention. An exemplary implementation of the messaging in step 207 (see FIG. 2) is based on the SCSI protocol, which is executed, for instance, via Fibre Channel (SAN), Ethernet (iSCSI) or parallel SCSI. In association with a new mode page, a SCSI mode select command is used to transfer a message from the backup server 108 (see FIG. 1) to the VTL 130 (see FIG. 1).

In one embodiment, SCSI mode select command 300 allows the sending of a mode page (e.g., mode page 400 in FIG. 4) from backup-controller 109 (see FIG. 1) to active-data-server 133 (see FIG. 1) so that backup server 108 (see FIG. 1) informs VTL 130 (see FIG. 1) about the client name and backup type.

SCSI mode select command 300 includes a command code 302 and a parameter list length 304. Command code 302 is 15h, for example, where the suffix h denotes hexadecimal or base 16. The command code 302 instructs the VTL 130 (see FIG. 1) that this command is a mode select command. The parameter list length 304 specifies the size of the subsequent parameters, which include a mode parameter header, block descriptor and mode page 400 (see FIG. 4) to be transferred in bytes. Subsequent to the sending of mode select command 300 in step 207 (see FIG. 2), the backup server 108 (see FIG. 1) sends the actual mode page 400 (see FIG. 4).

FIG. 4 depicts an exemplary mode page that is sent in the process of FIG. 2, in accordance with embodiments of the present invention. An exemplary mode page 400 includes a page code 402 and a page length 404. In this example, page code 402 is 25h, where the suffix h denotes hexadecimal or base 16, and page length 404 is 0Ah, which indicates that there are 10 bytes of additional parameters being sent. Parameter 406 includes the name of the client system 102 or 104 (see FIG. 1). The name of the client system in parameter 406 is a unique number or a unique computer name within a computer domain which is deployed in a backup system 100. Parameter 408 includes a number that encodes the type of backup which is being started. For example, parameter 408 includes 1000h to indicate a full backup, 2000h to indicate an incremental backup or 3000h to indicate a differential backup. Finally, parameter 410 includes a timestamp (e.g., the current date and time) encoded in, for instance, 6-byte hexadecimal format including day, month, year, hour, minute and second. The length in bytes allocated for the parameters 406, 408 and 410 vary depending on the implementation and the actual data to be transferred.

In response to the backup-controller 109 (see FIG. 1) of the backup server 108 (see FIG. 1) instructing the active-data-server 133 (see FIG. 1) of the VTL 130 (see FIG. 1) to mount a virtual tape for backup, the backup-controller transfers the mode page (e.g., mode page 400) in step 207 of FIG. 2. Mode page 400 includes metadata about the client name 406, backup type 408 and a timestamp 410 (e.g., the current date and time). The active-data-server 133 (see FIG. 1) included in VTL 130 (see FIG. 1) receives the metadata included in mode page 400 and stores the received metadata in a backup history database table (e.g., table 500 of FIG. 5). Thus, the backup history database table stores the backup history for each client, and each client in the backup history database table is identified by client name. The active-data-server 133 (see FIG. 1) subsequently analyzes the metadata stored in the backup history database table in order to complete execution of the active data process of FIG. 2.

FIG. 5 is an exemplary backup history database table accessed to select virtual tapes in the process of FIG. 2, in accordance with embodiments of the present invention. In one embodiment, backup history database table 500 is included in active-data-server 133 (see FIG. 1). In backup history database table 500, the active-data-server 133 (see FIG. 1) stores a type of a backup (column 506), a date and time (column 502) of a start of the backup, an identifier (i.e., client name) (column 504) of a client system that requests the backup, and an identification of the virtual tape(s) (column 508) that are used in the backup. In one embodiment, the virtual tape identification in column 508 is the unique volume serial number that identifies a virtual tape within an automated virtual tape library. The date and time, client name and type of backup in columns 502, 504 and 506, respectively, are derived from the mode page 400 (see FIG. 4), which is sent by the backup-controller 109 (see FIG. 1) to the active-data-server 133 (see FIG. 1) before the backup starts (i.e., in step 207 of FIG. 2).

The first row of data of table 500 indicates that a client system with the unique number 1234 (see column 504) started a full backup (see column 506) on Apr. 14, 2008 (i.e., Apr. 14, 2008) at the time of 18:00:00 (see column 502), and the full backup uses the virtual tape having the volume serial number of MIA000 (see column 508). Similarly, the second and third rows of data of table 500 indicate that client 1234 performed an incremental backup to volume MIA001 on subsequent days (i.e., Apr. 15, 2008 and Apr. 16, 2008). On Apr. 17, 2008 (see the fourth row of data of table 500), client 1234 performed a differential backup to volume MIA002. On the next two subsequent days (i.e., Apr. 18, 2008 and Apr. 19, 2008) (see the fifth and sixth rows of data of table 500), client 1234 performed an incremental backup to volume MIA003 before doing a full backup again on Apr. 20, 2008 (see the last row of data of table 500) to volume MIA004. The backup on Apr. 20, 2008 was the last backup for client 1234. Although not shown, similar entries are included in table 500 for client systems other than client 1234.

FIG. 6 depicts a modified position to element command for migrating selected virtual tapes in the process of FIG. 2, in accordance with embodiments of the present invention. The position to element command 600 includes an operation code (a.k.a. command code) 602, a logical unit number 604, a destination element address 608 and a migrate bit 610. The command code 602 is 2Bh. The logical unit number 604 is the SCSI address of the VTL 130 (see FIG. 1) which must receive the position to element command. The destination element address 608 specifies the element address of a virtual tape.

In one embodiment, an existing position to element command is extended to become command 600 by utilizing a reserved field as migrate bit 610. If the migrate bit 610 is set to binary 1, then the virtual tape addressed in destination element address 608 is migrated to the secondary medium (e.g., second VTL storage medium 136 of FIG. 1). Otherwise, if the value of migrate bit 610 is binary 0, then the virtual tape addressed in destination element address 608 is not migrated to the secondary medium (e.g., second VTL storage medium 136 of FIG. 1).

According to the active data process of FIG. 2 and more particularly step 232 of FIG. 2, the backup-controller 109 (see FIG. 1) sends the modified position to element command 600 to the active-data-server 133 (see FIG. 1). The position to element command 600 instructs the active-data-server 133 (see FIG. 1) to migrate the volume specified by the destination element address 608. Thus, the backup-controller 109 (see FIG. 1) controls the active data process of FIG. 2 and instructs the active-data-server 133 (see FIG. 1) to migrate the virtual tape(s) selected in steps 212 (see FIG. 2) or step 218 (see FIG. 2) to the secondary storage medium (e.g., second VTL storage medium 136 of FIG. 1). Accordingly, backup-controller 109 (see FIG. 1) maintains table 500 in the same way as described in the active data process of FIG. 2.

Computing System

Figure 7:
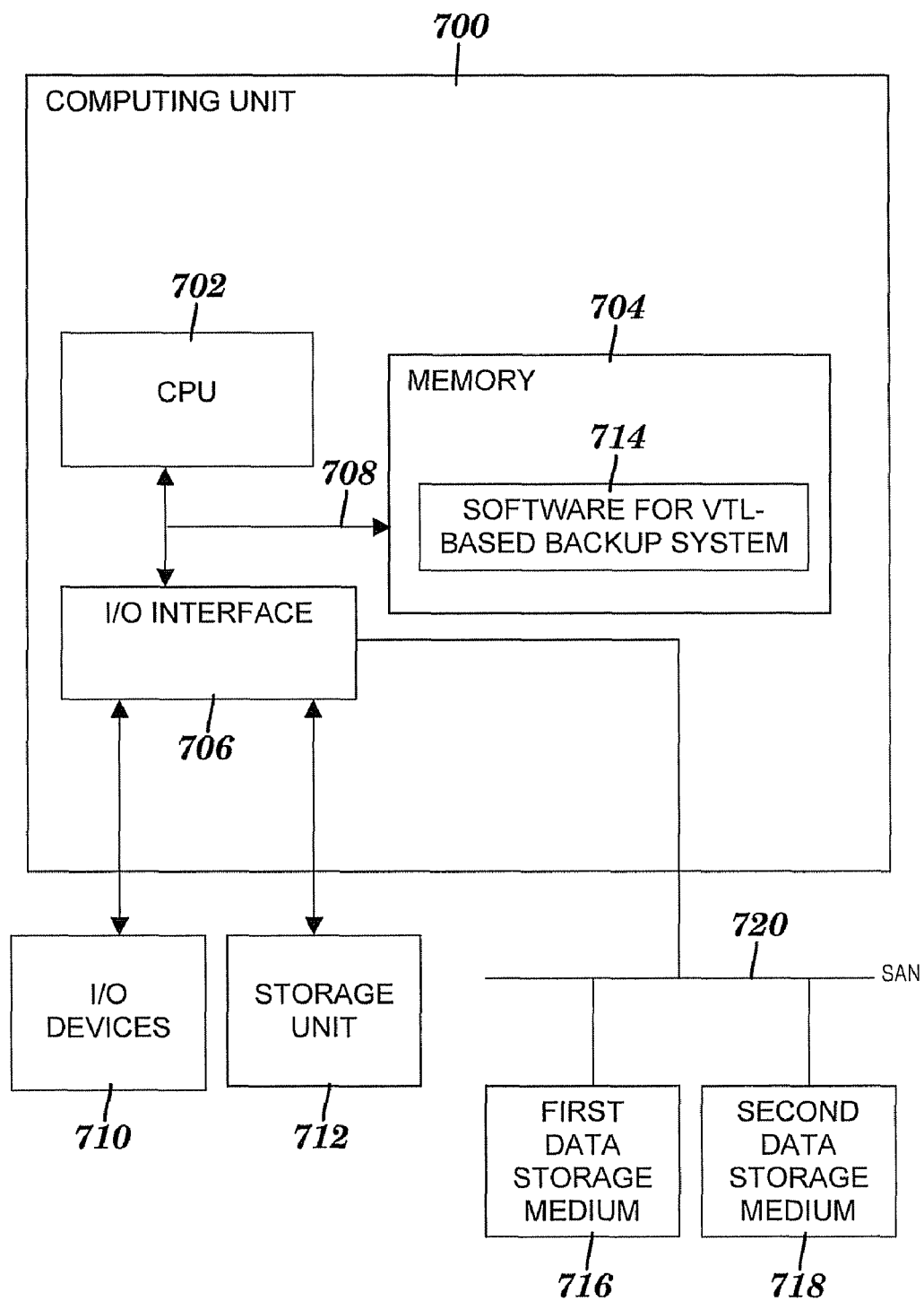
FIG. 7 is a block diagram of a computing system that is included in the system of FIG. 1 and implements the process of FIG. 2, in accordance with embodiments of the present invention.

FIG. 7 is a block diagram of a computing system that is included in the system of FIG. 1 and implements the process of FIG. 2, in accordance with embodiments of the present invention. In a first embodiment, computing system 700 is an example of backup server 108 (see FIG. 1). In a second embodiment, computing system 700 is an example of VTL controller 132 (see FIG. 1). Computing system 700 generally comprises a central processing unit (CPU) 702, a memory 704, an input/output (I/O) interface 706, a bus 708, I/O devices 710 and a computer data storage unit 712. CPU 702 performs computation and control functions of computing system 700. CPU 702 may comprise a single processing unit, or be distributed across one or more processing units in one or more locations (e.g., on a client and server).

Memory 704 may comprise any known type of computer data storage and/or transmission media, including bulk storage, magnetic media, optical media, random access memory (RAM), read-only memory (ROM), a data cache, a data object, etc. In one embodiment, cache memory elements of memory 704 provide temporary storage of at least some program code in order to reduce the number of times code must be retrieved from bulk storage during execution. Moreover, similar to CPU 702, memory 704 may reside at a single physical location, comprising one or more types of data storage, or be distributed across a plurality of physical systems in various forms. Further, memory 704 can include data distributed across, for example, a LAN, wide area network (WAN) or SAN 720. SAN 720 is an example of second network 116 (see FIG. 1).

I/O interface 706 comprises any system for exchanging information to or from an external source. I/O devices 710 comprise any known type of external device, including a display monitor, keyboard, mouse, printer, speakers, handheld device, printer, facsimile, etc. Bus 708 provides a communication link between each of the components in computing system 700, and may comprise any type of transmission link, including electrical, optical, wireless, etc.

I/O interface 706 also allows computing system 700 to store and retrieve information (e.g., program instructions or data) from an auxiliary storage device (e.g., computer data storage unit 712). The auxiliary storage device may be a non-volatile storage device, such as a hard disk drive or an optical disc drive (e.g., a CD-ROM drive which receives a CD-ROM disk). Computer data storage unit 712 is, for example, a magnetic disk drive (i.e., hard disk drive) or an optical disk drive. Via SAN 720, computing system 700 can manage the backup of data to a first data storage medium 716 and the automatic migration of older versions of the backed up data to a second data storage medium 718. First data storage medium 716 is an example of first VTL storage medium 134 (see FIG. 1). Second data storage medium is an example of second VTL storage medium 136 (see FIG. 1). In one embodiment, storage mediums 716 and 718 are computer data storage units that are both different from computer data storage unit 712. In another embodiment, one of the storage mediums 716 or 718 is computer data storage unit 712, and the other storage medium is another computer data storage unit (now shown).

Memory 704 includes computer program code 714 that provides the logic for the VTL-based data backup system disclosed herein (e.g., the process of FIG. 2). In one embodiment in which computing system 700 is an example of backup server 108 (see FIG. 1), computer program code 714 includes backup-controller 109 (see FIG. 1). In another embodiment in which computing system 700 is an example of VTL controller 132 (see FIG. 1), computer program code 714 includes active-data-server 133 (see FIG. 1). Further, memory 704 may include other systems not shown in FIG. 7, such as an operating system (e.g., Linux) that runs on CPU 702 and provides control of various components within and/or connected to computing system 700.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software (e.g., backup-controller 109 and active-data-server 133 of FIG. 1) and hardware aspects (e.g., backup server 108 and VTL 130 of FIG. 1) that may all generally be referred to herein as a "system" (e.g., system 100 of FIG. 1). Furthermore, the present invention may take the form of a computer program product embodied in any tangible medium of expression (e.g., memory 704) having computer-usable program code (e.g., software 714) embodied in the medium.

Any combination of one or more computer-usable or computer-readable medium(s) (e.g., memory 704) may be utilized. The computer-usable or computer-readable medium may be, for example but not limited to, an electronic, magnetic, optical, electromagnetic, infrared or semiconductor system, apparatus, device or propagation medium. A non-exhaustive list of more specific examples of the computer-readable medium includes: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code (e.g., software 714) for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer (e.g., backup server 108 of FIG. 1), partly on the user's computer, as a stand-alone software package, partly on the user's computer and partly on a remote computer or entirely on the remote computer or server. In the latter scenario, the remote computer may be connected to the user's computer through any type of network, including a LAN (e.g., first network 106 of FIG. 1) or a WAN, or the connection may be made to an external computer (e.g., through the Internet using an Internet Service Provider).

The present invention is described herein with reference to flowchart illustrations (e.g., FIG. 2) and/or block diagrams of methods, apparatus (systems) (e.g., FIG. 1), and computer program products according to embodiments of the invention. It will be understood that each block of the flowchart illustrations and/or block diagrams, and combinations of blocks in the flowchart illustrations and/or block diagrams, can be implemented by computer program instructions (e.g., backup-controller 109 and active-data-server 133 of FIG. 1). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium (e.g., memory 704) that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer (e.g., backup server 109 of FIG. 1) or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Any of the components of the present invention can be deployed, managed, serviced, etc. by a service provider that offers to deploy or integrate computing infrastructure with respect to the method of managing storage and migration of backup data. Thus, the present invention discloses a process for supporting computer infrastructure, comprising integrating, hosting, maintaining and deploying computer-readable code into a computing system (e.g., computing system 700), wherein the code in combination with the computing system is capable of performing a method of managing storage and migration of backup data.

In another embodiment, the invention provides a business method that performs the process steps of the invention on a subscription, advertising and/or fee basis. That is, a service provider, such as a Solution Integrator, can offer to create, maintain, support, etc. a method of managing storage and migration of backup data. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code (e.g., code 714), which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of managing storage and migration of backup data, said method comprising:
receiving, by a virtual tape library (VTL) controller included in a VTL, and via an execution of a first software method and in response to a receipt of a request from a client computing system for a backup of a set of data to generate backup data, metadata that distinguishes among a plurality of different versions of said backup data, wherein said VTL includes a first storage medium and a second storage medium, wherein said metadata includes a type of said backup of said set of data, and wherein said type of said backup is a full backup that is a backup of all data of said set of data, a differential backup that is a cumulative backup of data of said set of data that changes since a latest full backup, or an incremental backup that is a backup of data of said set of data that changes since a latest backup of any type;
determining, by said VTL controller, a latest version of said backup data, wherein said latest version is included in said plurality of different versions of said backup data;
based on said type of said backup included in said received metadata, determining, by said VTL controller, a migration set of zero or more virtual tapes of a plurality of virtual tapes of said VTL, wherein said migration set is selected from the group consisting of a set of one or more virtual tapes of said plurality of virtual tapes and an empty set including no virtual tape of said plurality of virtual tapes;
determining, by said VTL controller and subsequent to said determining said latest version, a storage of said latest version in said first storage medium included in said VTL is complete; and
migrating, by said VTL controller and subsequent to said determining said migration set, one or more versions of said backup data from said first storage medium included in said VTL to said second storage medium included in said VTL by migrating said migration set from said first storage medium included in said VTL to said second storage medium included in said VTL if said migration set is said set of one or more virtual tapes, so that said first storage medium retains said storage of said latest version of said backup data and said second storage medium includes at least one version of said backup data that is not said latest version of said backup data.

2. The method of claim 1, wherein said receiving said metadata includes receiving a client name, said type of said backup, and a timestamp included in said metadata, wherein said client name is an identifier of said client computing system, and wherein said timestamp includes a date and a time of said backup of said set of data.

3. The method of claim 2, wherein said migration set is said set of one or more virtual tapes of said plurality of virtual tapes, and wherein said method further comprises:
identifying a first virtual tape identifier that identifies a first virtual tape included in said first storage medium;
updating a first record of a database table with said client name, said type of said backup, said timestamp and said first virtual tape identifier;
identifying a second virtual tape identifier that identifies a second virtual tape included in said second storage medium;
determining a second record of said database table includes said second virtual tape identifier;
based on said second record including said second virtual tape identifier, removing said second record from said database table.

4. The method of claim 2, wherein said determining said migration set includes:
determining said type of said backup is said full backup of said set of data;
determining one or more records of a database table include one or more identifiers of said one or more virtual tapes of said set of one or more virtual tapes of said VTL, one or more old timestamps, said client name and an indication of any type of a backup of a version of said set of data, wherein each old timestamp indicates said backup of said version of said set of data occurred prior to said backup of said set of data;
selecting said one or more records of said database table based on said one or more records including said client name and said indication of any type of said backup of said version of said set of data; and
determining said migration set is said set of one or more virtual tapes rather than said empty set based on said one or more records including said one or more identifiers of said one or more virtual tapes.

5. The method of claim 2, wherein said determining said migration set includes:
determining said type of said backup is said differential backup of said set of data;
determining one or more records of a database table include one or more identifiers of said one or more virtual tapes of said set of one or more virtual tapes of said VTL, one or more old timestamps, said client name and an indication of said incremental backup of one or more versions of said set of data, wherein each old timestamp indicates said incremental backup of said one or more versions of said set of data occurred prior to said backup of said set of data;
selecting said one or more records of said database table based on said one or more records including said client name and said indication of said incremental backup; and
determining said migration set is said set of one or more virtual tapes rather than said empty set based on said one or more records including said one or more identifiers of said one or more virtual tapes.

6. The method of claim 2, wherein said determining said migration set includes:
determining said type of said backup is not said full backup of said set of data and is not said differential backup of said set of data;
determining one or more records of a database table include said client name and an indication of said incremental backup of a version of said set of data;

determining said migration set is said empty set rather than said set of one or more virtual tapes based on said one or more records including said client name and said indication of said incremental backup.

7. The method of claim 2, further comprising:
identifying said type of said backup as said full backup of said set of data; and
mounting, in response to said identifying said type of said backup as said full backup, a new virtual tape in said VTL, wherein said new virtual tape stores no data from said plurality of different versions of said backup data.

8. The method of claim 2, further comprising:
identifying said type of said backup as said differential backup of said set of data;
determining an amount of data stored in a first virtual tape in said VTL is less than a storage capacity of said first virtual tape, wherein said first virtual tape stores a most recent full backup version of said backup data, and wherein said most recent full backup version is included in said plurality of different versions of said backup data and is a result of another backup whose type is said full backup; and
mounting, in response to said determining said amount of data is less than said storage capacity, said first virtual tape in said VTL.

9. The method of claim 2, further comprising:
identifying said type of said backup as said differential backup of said set of data;
determining an amount of data stored in a first virtual tape in said VTL is equal to a storage capacity of said first virtual tape, wherein said first virtual tape stores a most recent full backup version of said backup data, and wherein said most recent full backup version is included in said plurality of different versions of said backup data and is a result of another backup whose type is said full backup; and
mounting, in response to said determining said amount of data is equal to said storage capacity, a new virtual tape in said VTL, wherein said new virtual tape stores no data from said plurality of different versions of said backup data.

10. The method of claim 2, further comprising:
identifying said type of said backup as said incremental backup of said set of data;
determining an amount of data stored in a first virtual tape in said VTL is less than a storage capacity of said first virtual tape, wherein said first virtual tape stores a most recent full backup version of said backup data, wherein said most recent full backup version is included in said plurality of different versions of said backup data and is a result of another backup whose type is said full backup; and
mounting, in response to said determining said amount of data is less than said storage capacity, said first virtual tape in said VTL.

11. The method of claim 2, further comprising:
identifying said type of said backup as said incremental backup of said set of data;
determining an amount of data stored in a first virtual tape in said VTL is equal to a storage capacity of said first virtual tape, wherein said first virtual tape stores a most recent full backup version of said backup data, and wherein said most recent full backup version of said backup data is included in said plurality of different versions of said backup data and is a result of another backup whose type is said full backup; and
mounting, in response to said determining said amount of data is equal to said storage capacity, a second virtual tape in said VTL, wherein said second virtual tape stores a most recent differential backup version of said backup data, and wherein said most recent differential backup version of said backup data is included in said plurality of different versions of said backup data and is a result of another backup whose type is said differential backup.

12. The method of claim 2, further comprising:
identifying said type of said backup as said incremental backup of said set of data;
determining an amount of data stored in a first virtual tape in said VTL is equal to a storage capacity of said first virtual tape, wherein said first virtual tape stores a most recent full backup version of said backup data, and wherein said most recent full backup version of said backup data is included in said plurality of versions of said backup data and is a result of another backup whose type is said full backup;
determining an amount of data stored in a second virtual tape in said VTL is equal to a storage capacity of said second virtual tape, wherein said second virtual tape stores a most recent differential backup version of said backup data, and wherein said most recent differential backup version of said backup data is included in said plurality of versions of said backup data and is a result of another backup whose type is said differential backup; and
mounting, in response to said determining said amount of data stored in said first virtual tape is equal to said storage capacity of said first virtual tape and in response to said determining said amount of data stored in said second virtual tape is equal to said storage capacity of said second virtual tape, a new virtual tape in said VTL, wherein said new virtual tape stores no data from said plurality of different versions of said backup data.

13. The method of claim 1, wherein said receiving said metadata includes receiving said metadata from a backup server computing system executing a second software method that sends said metadata to said VTL controller via a storage area network.

14. The method of claim 1, wherein said receiving said metadata includes receiving said metadata from said client computing system via a storage area network.

15. The method of claim 1, wherein said method further comprises receiving, by said VTL controller, a Small Computer System Interface (SCSI) mode select command, and wherein said receiving said metadata includes receiving, subsequent to receiving said SCSI mode select command, a mode page that includes an identifier of said client computing system, an identifier of said type of said backup of said set of data, and a timestamp indicating a time of said backup of said set of data.

16. A computing system comprising a processor coupled to a computer-readable memory unit, said memory unit comprising a software application, said software application comprising instructions that when executed by said processor implement the method of claim 1.

17. A computer program product, comprising a tangible, computer-readable storage device having a computer-readable program code stored therein, said computer-readable program code comprising an algorithm adapted to implement the method of claim 1.

18. A process for supporting computing infrastructure, said process comprising providing at least one support service for at least one of creating, integrating, hosting, maintaining, and deploying computer-readable code in a second computing system, wherein the code in combination with the second computing system is capable of performing a method of managing storage and migration of backup data, said method comprising:

receiving, by a virtual tape library (VTL) controller included in a VTL, and via an execution of a first software method and in response to a receipt of a request from a client computing system for a backup of a set of data to generate backup data, metadata that distinguishes among a plurality of different versions of said backup data, wherein said VTL includes a first storage medium and a second storage medium, wherein said metadata includes a type of said backup of said set of data, and wherein said type of said backup is a full backup that is a backup of all data of said set of data, a differential backup that is a cumulative backup of data of said set of data that changes since a latest full backup, or an incremental backup that is a backup of data of said set of data that changes since a latest backup of any type;

determining, by said VTL controller, a latest version of said backup data, wherein said latest version is included in said plurality of different versions of said backup data;

based on said type of said backup included in said received metadata, determining, by said VTL controller, a migration set of zero or more virtual tapes of a plurality of virtual tapes of said VTL, wherein said migration set is selected from the group consisting of a set of one or more virtual tapes of said plurality of virtual tapes and an empty set including no virtual tape of said plurality of virtual tapes;

determining, by said VTL controller and subsequent to said determining said latest version, a storage of said latest version in said first storage medium included in said VTL is complete; and migrating, by said VTL controller and subsequent to said determining said migration set, one or more versions of said backup data from said first storage medium included in said VTL to said second storage medium included in said VTL by migrating said migration set from said first storage medium included in said VTL to said second storage medium included in said VTL if said migration set is said set of one or more virtual tapes, so that said first storage medium retains said storage of said latest version of said backup data and said second storage medium includes at least one version of said backup data that is not said latest version of said backup data.

19. A computer-implemented method of managing storage and migration of backup data, said method comprising:

receiving, by a backup server, from a client computing system, and in response to a receipt of a request from said client computing system for a backup of a set of data to generate backup data, metadata that distinguishes among a plurality of different versions of said backup data, wherein said receiving said metadata includes receiving a client name, a type of said backup of said set of data, and a timestamp included in said metadata, wherein said client name is an identifier of said client computing system, wherein said timestamp includes a date and a time of said backup of said set of data, and wherein said type of said backup is a full backup that is a backup of all data of said set of data, a differential backup that is a cumulative backup of data of said set of data that changes since a latest full backup, or an incremental backup that is a backup of data of said set of data that changes since a latest backup of any type;

determining, by said backup server, a latest version of said backup data, wherein said latest version is included in said plurality of different versions of said backup data;

identifying a first virtual tape of a virtual tape library (VTL), wherein said identifying said first virtual tape includes identifying said type of said backup included in said metadata, and wherein said VTL includes a first storage medium and a second storage medium;

mounting said first virtual tape by said backup server;

determining, by said backup server and based on said type of said backup included in said metadata, a migration set of one or more virtual tapes of a plurality of virtual tapes of said VTL;

determining, by said backup server and subsequent to said determining said latest version, a storage of said latest version in said first storage medium included in said VTL is complete;

instructing, by said backup server, said VTL to perform a migration of one or more versions of said backup data from said first storage medium included in said VTL to said second storage medium included in said VTL by a migration of said migration set from said first storage medium included in said VTL to said second storage medium included in said VTL, so that said first storage medium retains said storage of said latest version of said backup data and said second storage medium includes at least one version of said backup data that is not said latest version of said backup data;

determining, by said backup server, that said migration of said migration set to said second storage medium is complete;

identifying, by said backup server, a first virtual tape identifier that identifies said first virtual tape included in said first storage medium;

updating, by said backup server, a first record of a database table with said client name, said type of said backup, said timestamp and said first virtual tape identifier;

identifying, by said backup server, a second virtual tape identifier that identifies a second virtual tape included in said second storage medium;

determining a second record of said database table includes said second virtual tape identifier;

based on said second record including said second virtual tape identifier, removing said second record from said database table and by said backup server.

20. The method of claim 19, wherein said instructing said VTL to perform said migration of said one or more versions of said backup data from said first storage medium to said second storage medium includes:

sending, by said backup server to said VTL, a modification of a Small Computer System Interface (SCSI) position to element command that includes a command code, a logical unit number, a transport element address, a destination element address, and a migrate field, wherein said logical unit number is a SCSI address of said VTL, and wherein said destination element address specifies an element address of a second virtual tape that includes a version of said backup data included in said migration set;

identifying a predefined migration indicator stored in said migrate field; and migrating, in response to identifying said predefined migration indicator, said second virtual tape to said second storage medium.

* * * * *